Jan. 13, 1959    R. EICHENBERG ET AL    2,868,221
PLUG VALVE

Filed Sept. 24, 1956    3 Sheets-Sheet 1

Robert Eichenberg
Ray S. Burns
INVENTORS

BY Carl B. Fox, Jr.

ATTORNEY

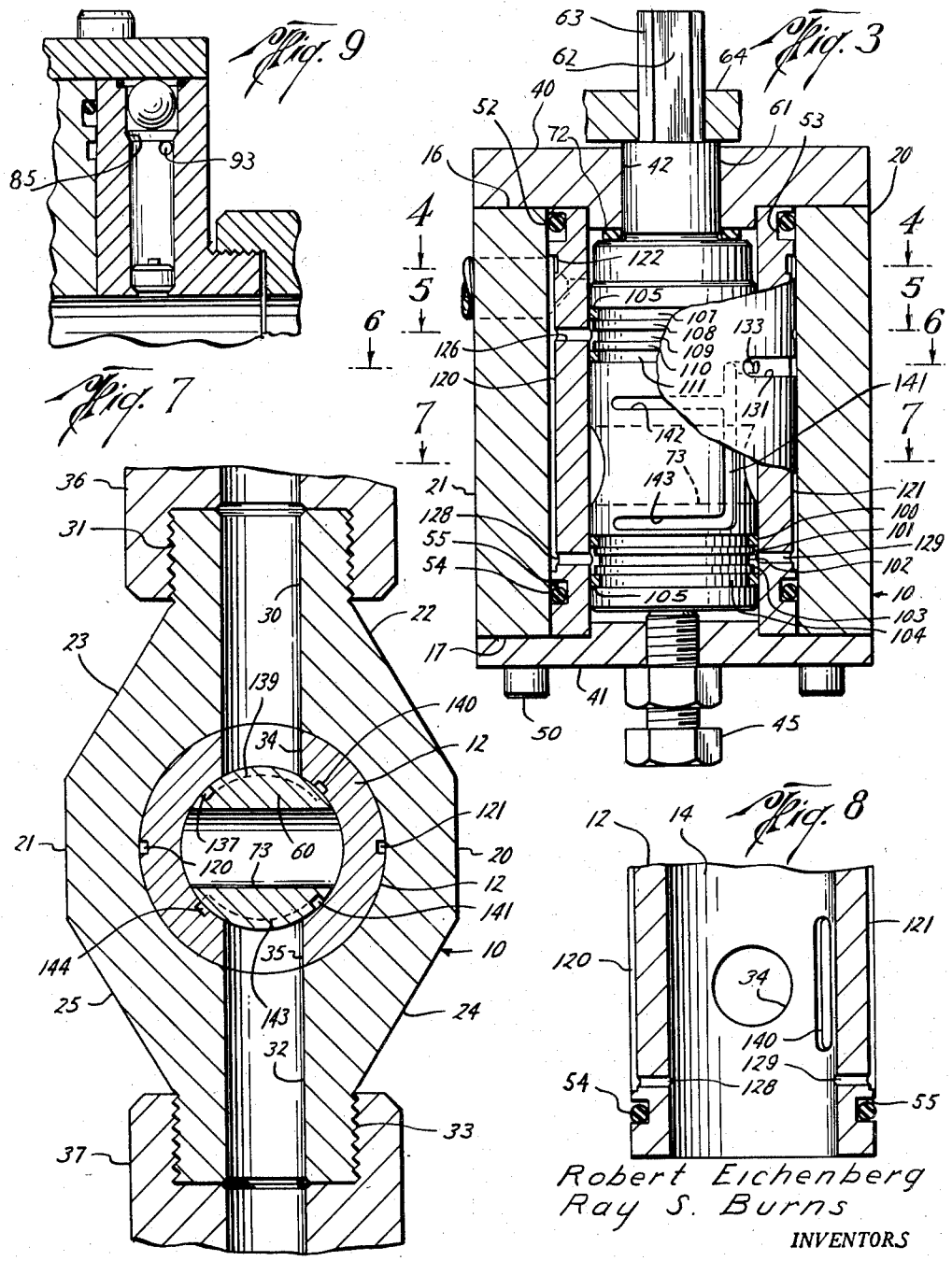

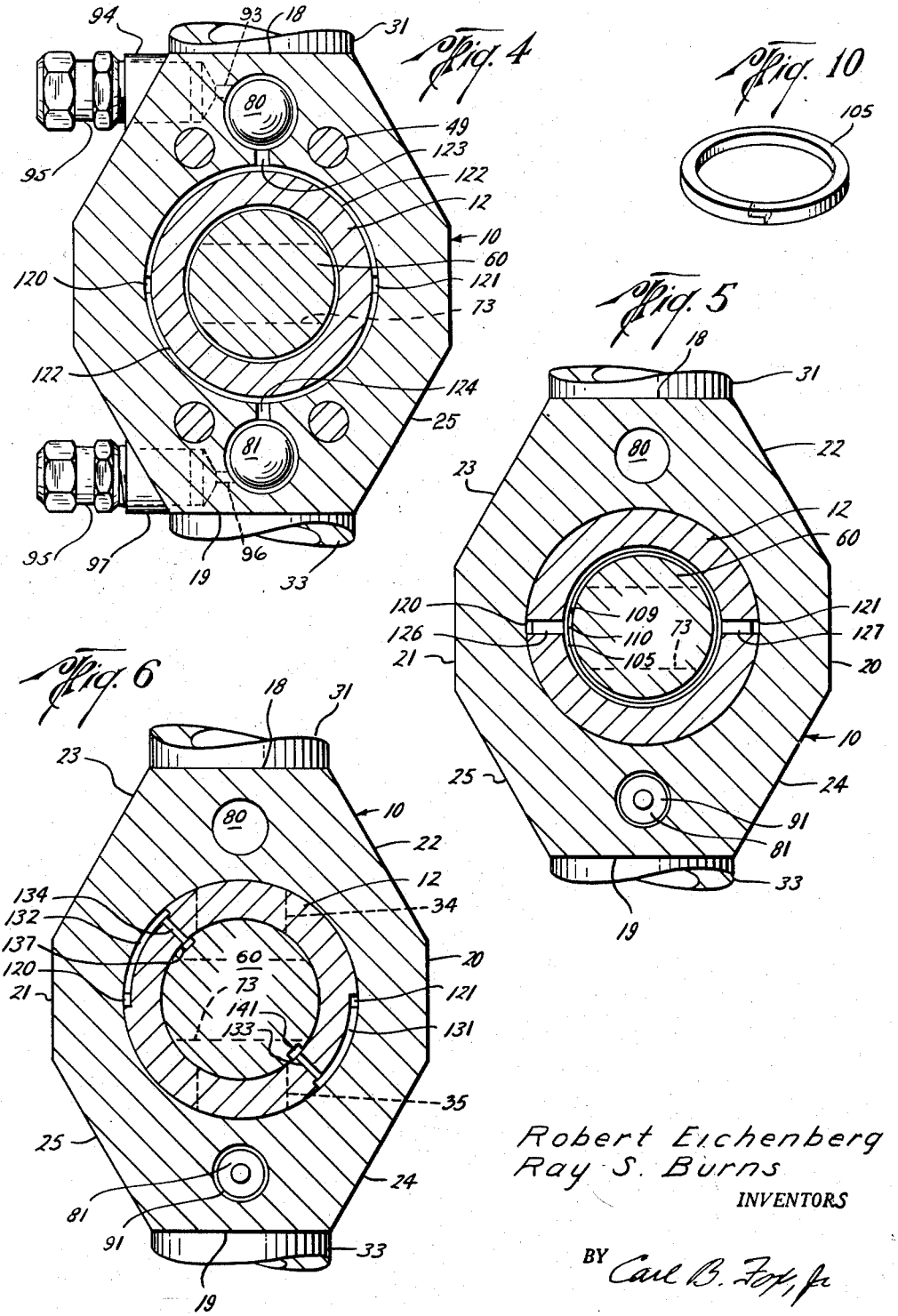

United States Patent Office 2,868,221
Patented Jan. 13, 1959

2,868,221

PLUG VALVE

Robert Eichenberg and Ray S. Burns, Houston, Tex., assignors to George A. Butler, Houston, Tex.

Application September 24, 1956, Serial No. 611,642

6 Claims. (Cl. 137—246.12)

This invention relates to valves, and more particularly to plug valves.

The principal object of the invention is to provide a valve that will handle high pressure abrasive thixotropic fluids such as drilling fluid and especially cement used in drilling and completing oil wells. To this end, a solid cylindrical plug or valve member is used which, although it is free to float to the downstream side of the valve, fits closely within the valve body so that it is always close to both of the seats in the valve body, thereby minimizing the quantity of abrasive particles that enter between the sealing surfaces of the valve. The solid plug or core has the further advantage of eliminating the possibility of pressure locking of the valve which is inherent in valves of the split core type.

Automatic plastic seals are provided to eliminate the need for putting the sealing surfaces under mechanical pressure to effect a seal and to insure effective shut off despite wear of the sealing surfaces. Two sealant reservoirs are provided which are placed in wide open communication with the valve inlet and outlet flow passages and oriented relative to the usual upright position of the valve so that gravity acts to drain the reservoirs of line fluid. With this arrangement any line fluid will tend to run out of the reservoirs before it cakes, sets up, or hardens in the reservoirs, and if any cake is formed the injection of sealant into the upper ends of the reservoirs will force the cake out into the flow passages rather than into the valve body so that it can more easily be carried away from the valve by line fluid. The use of reservoirs pressured from the flow passages of the valve body has the further advantage that it is not necessary to rely on fluid entering the plug chamber of the valve body to achieve seals.

A further object of the invention is to provide a valve that is reversible, that is, one which will shut off pressure in either direction. That is particularly important in the cementing and mud line service where direction of fluid flow is frequently reversed. To this end, means are provided for making the full pressure differential between upstream and downstream sides of the valve immediately available to the sealant in the downstream seal groove as soon as the valve is moved to closed position. As will appear hereinafter this involves the use of check valves to prevent the downstream reservoir from receiving sealant from the upstream reservoir so that when the valve is reversed it will not first be necessary to fill the downstream reservoir before full pressure is applied to the sealant in the downstream seal groove.

A further object of the invention is to provide a light weight valve. This is particularly advantageous in cementing service where many valves must be used on a single cementing truck whose total weight must be kept low enough to allow travel over public highways. To this end, there is eliminated the usual heavy bolted or screwed-on bonnet for closing and sealing pressuretight the opening through which the plug is inserted in the valve body. Also, the usual additional special packing gland used to seal between the rotatable valve stem and the bonnet is eliminated. Instead, the stem end of the plug is itself sealed to the valve body around the mouth of the opening through which the plug may be inserted into the valve body. To avoid thrust on the plug due to line pressure acting on the opposite end, the part of the valve body opposite from the valve stem is also opened to atmospheric pressure and the adjacent end of the plug sealed to the valve body the same as at the stem end. The result is a valve in which there is no end thrust on either the plug or stem so that the plug can turn easily without the need for special anti-friction thrust bearings.

Another object of the invention is to provide a valve which is not only effective to seal efficiently at high pressure but is easy to open and close. To this end there is provided sufficient clearance, i. e., difference between the outer diameter of the plug and the inner diameter of the plug chamber in the valve body, to insure that the plug will still be free to turn when the chamber distorts underline pressure. The valve body is made heavy enough so that this distortion will not be too great under the expected pressure and the clearance will not have to be too large, for otherwise there would be room for large size abrasive particles to enter between the plug and the plug chamber.

The end seals of the plug are of the automatic plastic sealed variety so as to seal despite the clearance between plug and valve body required, as mentioned above, in order that the valve can be free both to turn and float in the plug chamber. Because of the clearance each of the end seals is provided also with inner and outer expansible piston rings (split with overlapping ends). The outer piston ring reduces the clearance to be sealed by the plastic sealant. The inner piston ring, which preferably makes a tighter fit than the outer one, insures that the pressure in the valve body is not directly connected to the sealant in the end seal groove, which would short circuit the automatic operation of the sealing system. In other words, the inner piston ring provides a pressure drop from the upstream pressure in the valve body to the sealant in the end seal groove.

In determining the proper clearance for the valve, two factors are to be borne in mind. As the clearance increases, the pressure at which the valve can be operated without binding the body to the plug increases. On the other hand, as the clearance increases, the difficulty in plastic sealing, especially of the plug ends, increases. With the sealant materials disclosed hereinafter a clearance of .004 to .006 inch has been found to be of the right order of magnitude.

Since both of the end seals must be pressured at all times both when the valve is open and closed and regardless of which flow port is sealed when the valve is closed, both the reservoirs must be connected to the end seals thereby tying together the sealing systems for both flow ports. This results in at least a portion of the distribution passages from one reservoir to one flow port seal being available also for flow of sealant from the other reservoir to the other flow port seal so that the resistance to sealant flow in the distribution passages is thereby reduced.

A further object of the invention is to provide a valve that is easy to manufacture and repair. To this end there is provided a removable liner or seat sleeve in the valve body so that when the seats or areas around the flow ports are worn or scored by the abrasive fluids, the sleeve can be easily removed and replaced. The plug can also be replaced in like manner. This can be done without removing the valve body from the line since the seat sleeve and the plug are held in position merely by upper and lower cover plates fastened to the body by screws which are easily removed. The reservoirs are bored from the top of the valve body and closed by the upper cover plate so that they are easily machined and are readily accessible for cleaning.

The sealant distribution passages from the reservoir to the flow port seal grooves and the end seal grooves are formed by cutting grooves in the face of the sleeve and ports through the sleeve wall. This facilitates manufacture of the distribution passages and they are of course replaced whenever the sleeve is changed.

The sealant material preferred for the purpose of forming the seals to be described herein is insoluble in the fluid moving through the valve. It is designed to flow easily under pressure in large passages and to offer a high resistance to flow between closely engaged surfaces. The flow resistant quality should be of a very high order. To give this high order of resistance there is included in the sealant compound suspended essentially solid particulated material, preferably in the form of chunks having dimensions of the same order of magnitude in all directions as distinguished from elongated or fibre-like particles. The range of particle size preferably is between the size of opening to be sealed and somewhat smaller. Generally, the particles are about one-half to two-thirds (in diameter or maximum dimension) the size of the opening to be sealed, but the particle sizes may vary somewhat from these values, depending on the type of sealant material required. As an example of a suitable sealant material, it has been found that a very suitable material may be composed of polymerized castor oil and finely divided mica and/or asbestos. Where the clearance to be sealed is about 0.004–0.006 inch, then this material will function satisfactorily with the mica and/or asbestos subdivided to a 0.002–0.003 inch size. The proportion of particles in the material should be low enough so that the material is free-flowing in the distribution passages at the pressures involved and high enough to quickly form a satisfactory seal in the crevice to be sealed.

Other objects, uses, advantages, and improvements will appear from the following description of a preferred embodiment of the invention, reference being made to the accompanying drawings, of which:

Figure 3 is a vertical section taken at line 3—3 of Figure 1;

Figure 2:
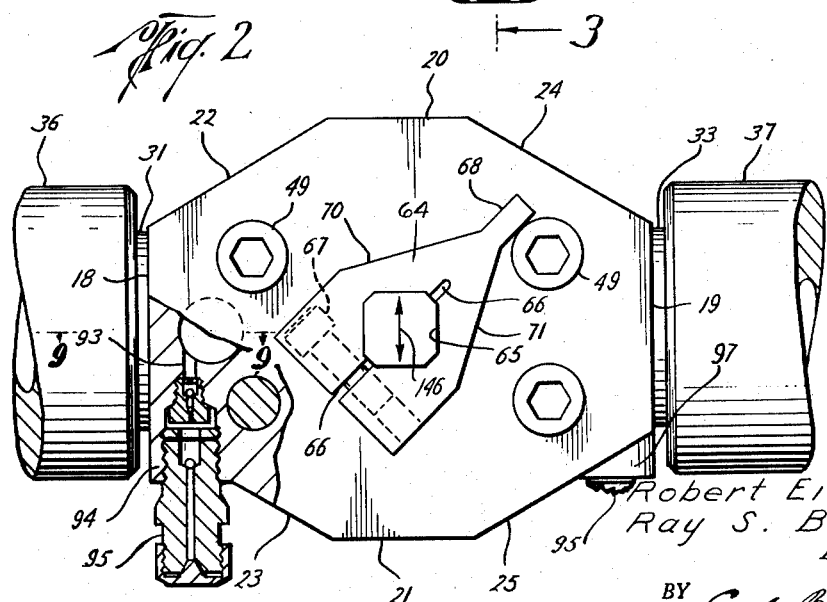
Figure 2 is a top view of the valve shown in Figure 1, partly in horizontal section, taken at line 2—2 of Figure 1.

Figures 4, 5, 6, and 7 are horizontal sections through the valve, taken, respectively, at lines 4—4, 5—5, 6—6, and 7—7 of Figure 3;

Figure 8 is a partial view in vertical section of the valve plug sleeve;

Figure 9 is a partial vertical section taken on line 9—9 of Figure 2; and

Figure 10 is a perspective view showing one of the piston rings.

Figure 1:
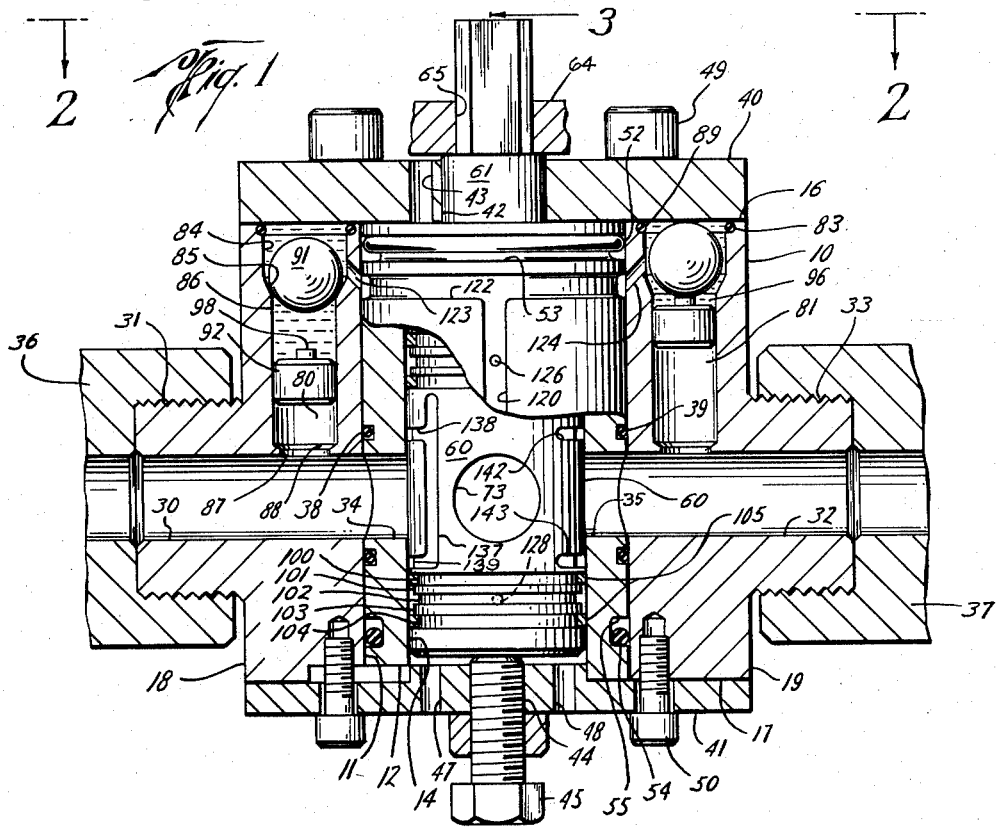
Figure 1 is a side view, largely in vertical section, of a valve according to the invention.

Referring now to the drawings in detail, and first to Figures 1 and 2 thereof, a valve body 10 of generally decahedronal form has a vertical cylindrical sleeve opening 11 therethrough into which a tubular sleeve 12 is received, sleeve 12 having an axial opening 14 concentric with the opening 11. The upper and lower faces 16, 17, of body 10 are in the form of elongated octagons, and the axes of openings 11 and 14 pass through the centers of these faces and perpendicularly thereto. Body 10 has opposite sides 18, 19, which are spaced apart farther than transverse opposite sides 20, 21, and four diagonal body sides 22, 23, 24, 25, complete the outward body form, the faces 16, 17, being horizontal, and the sides 18, 19, 20, 21, 22, 23, 24, 25, being vertical when the body is in its upright position.

A flow passage or bore through body 10 comprises a bore 30 extending from opening 11 past body face 18 and terminating through an outwardly formed integral threaded nipple 31 on face 18, a bore 32 extending from the opposite side of opening 11 past body face 19 and terminating through an outwardly formed integral threaded nipple 33 on face 19, and two oppositely disposed bore openings 34, 35, through the sides of sleeve 12, bores 30, 32, and openings 34, 35, being axially aligned and of the same size. Pipe sections 36, 37, of a pipe system, e. g., a drilling fluid line, are interiorly threaded at their ends and are screwed onto bore nipples 31, 33, respectively, the internal diameters of the pipe sections being the same as the diameter of the valve bores.

Seals at the juncture of bore 30 and opening 34 and at the juncture of bore 32 and opening 35 are respectively provided by a packing ring 38 disposed in a suitable sleeve-face groove around opening 34, and an identical packing ring 39 disposed in a suitable sleeve-face groove around opening 35, these packing rings preventing the leakage of drilling fluid from bores 30, 32, to between the sleeve and body.

A cover plate 40 and a bottom plate 41, both of an octagonal shape conforming with body faces 16, 17, are respectively bolted to those faces. Cover plate 40 has a central stem opening 42 therethrough and a vent opening 43 therethrough slightly spaced from opening 42 toward body side 18. Bottom plate 41 has a central tapped opening 44 to receive a bolt 45 therethrough, and two drain holes 47, 48, spaced therefrom toward body sides 18, 19, respectively. Cover 40 and bottom 41 are each held in place by bolts 49, 50, respectively, received therethrough and screwed into suitable tapped openings in body 10.

Leakage around the ends of sleeve 12 is prevented by an upper packing ring 52 disposed in a groove 53 around the upper end of the sleeve and by a lower packing ring 54 disposed in a groove 55 around the lower end of the sleeve.

A cylindrical plug 60 is received within the axial opening 14 of sleeve 12, between cover plate 40 and bottom plate 41. The center of the bottom of the plug rests upon the inner end of the bolt 45. Plug 60 is rotatable within the sleeve opening and also may slide laterally slightly upon the inner end of bolt 45, for a purpose to be explained. At its upper end (see also Figure 3) plug 60 has an extending portion 61 of reduced diameter forming a valve stem which is rotatably disposed through opening 42 of cover plate 40. There is sufficient clearance between stem 61 and opening 42 to allow the plug to move laterally to the downstream flow port. Above reduced plug portion 61 of plug 60, there is formed a square end shaft 62 having beveled edges 63 over which a handle 64 is slipped. Handle 64 has a hole 65 therethrough of a shape corresponding to the shape of end shaft 62, and a slot 66 from one end to beyond hole 65. A bolt 67 holds the split ends of handle 64 together to clamp the handle onto end shaft 62. The slot 66 makes the split handle ends resilient so that they may be tightly clamped to either side of the shaft by the bolt 67. The non-split end 68 of the handle 64 is reduced for grasping or for receiving a length of pipe thereover for turning the end shaft 62 and plug 60 within the sleeve opening 14. The sides of handle 64 are beveled as at 70, 71, between the wider split end and the narrower holding end. The heads of bolts 49 are positioned above the cover 40 to act as handle stops between which the plug may be rotated over an angle of 90° within the sleeve.

A wear ring or thrust washer 72, usually bronze, around the lower end of reduced plug portion 61 between the plug and top plate 40 permits the upper end of the plug to float or shift slightly laterally within the sleeve and absorbs any upward end thrust on the plug such as may be due to torque applied to the valve stem not in a plane perpendicular to the stem axis.

Plug 60 has a lateral bore opening 73 therethrough which is rotatable with plug 60 into alignment with bores 30, 32, and sleeve bore openings 34, 35 to complete the flow path through the valve.

Referring now to all of the drawings, body 10 has therein two sealant reservoirs 80, 81, reservoir 80 extending vertically from upper face 16 of the body to the bore 30. Reservoir 80 is centered about halfway between body side 18 and body opening 11. Reservoir 81 is located identically at the other end of body 10, between body side 19 and the other side of body opening 11, and runs vertically between body face 16 and bore 32. The two reservoirs are identical in form, each having, from top to bottom, a shallow ring groove 83 at face 16 which extends outwardly around the top of a cylindrical ball chamber 84, at the lower end of which is an upwardly-facing conically-formed annular seat 85 merging into a cylindrically formed sealant space 86 therebelow, the sealant space being terminated at its lower end by an inwardly projecting annular flange 87 having a conically bevelled upper seat 88. A packing ring 89, which may be an O-ring, is received in ring groove 83 to seal around the upper end of each reservoir against the lower face of the cover plate 40. A spherical metal ball 91, seatable on conical seat 85, is movably disposed in each ball chamber 84. A piston 92 is slidably and sealingly disposed in each sealant space 86, to movably seal between upper and lower parts of the sealant space. A port 93 leads from the valve exterior at side 23 to reservoir 80, entering the reservoir at the upper end of its sealant space 86 just below seat 85. Port 93 has an outer threaded socket 94 to receive a suitable grease fitting, i. e., check valve 95 for injection of a sealant material into the reservoir. Identically, at the other end of the valve, a port 96 having socket 97 at body face 25, leads from the exterior of the valve to reservoir 81. A suitable grease fitting 95 is received into socket 97. The balls 91 and ball chambers 84 are of such proportions that the ball, when upward in the chamber against cover 40, will contact a protruding stop 98 at the upper surface of each piston 92 to keep the pistons from entirely covering the entrances of the ports 93, 96, to the respective reservoirs, thereby insuring that sealant material may always be introduced to the reservoirs even when the pistons 92 are at their highest positions near the upper ends of their respective sealant spaces. The lower edge of each piston 92 is beveled to sealingly seat upon the lower end flange seat 88 of its sealant space.

A novel sealing means is provided around each end of the plug 60 within sleeve opening 14. Around the lower end of plug 60, there is formed a wide groove means comprising an upper piston ring groove 100, an upper spacer flange 101 of a diameter less than the plug diameter, a center sealant groove 102, a lower spacer flange 103, and a lower piston ring groove 104. A split-ring piston ring 105, see also Figure 10, is received in each of the grooves 100 and 104 between a spacer flange and an end of the groove means. The two piston rings provide seals around plug 60 above and below the sealant groove 102.

Around the upper end of plug 60 within sleeve 12 there is formed an identical wide groove means comprising an upper piston ring groove 107, an upper spacer flange 108, a center sealant groove 109, a lower spacer flange 110, and a lower piston ring groove 111, and a split-ring piston ring 105 is received in each of the grooves 107, 111, to provide seals above and below sealant groove 109.

Completing the description of the novel sealing system, two vertical grooves 120, 121 are formed at opposite sides of the exterior surface of sleeve 12, both of the grooves being at positions 90° around the sleeve from the centers of openings 34, 35. These grooves communicate at their upper ends with a groove 122 around the sleeve below packing ring groove 53. A downwardly diagonal port 123 leads from ball chamber 84 of reservoir 80, above seat 85, to body opening 11, and port 123 enters opening 11 at the level of groove 122 to communicate therewith. At the opposite side of opening 11 an identical port 124 leads from ball chamber 84 of reservoir 81 to groove 122.

The vertical grooves 120, 121, communicate with plug sealant groove 109 through respective ports 126, 127, which lead from the grooves through the sleeve wall at the level of groove 109 (see Figure 5). Similar ports 128, 129, respectively lead from grooves 120, 121, to lower plug sealant groove 102 (see Figure 3). Therefore, sealant can flow from either reservoir 80 or 81, through port 123 or 124, to groove 122, and thence to plug grooves 102, 109 through grooves 120, 121, and ports 126, 127, 128, 129.

Below the upper plug piston ring groove set 107—111, a pair of grooves 131, 132, each branch from one of the vertical sleeve grooves 121, 120, respectively, to supply sealant material to the means for sealing around the flow-path bores at the plug. Referring particularly to Figures 3 and 6, groove 131 is formed in the outer surface of sleeve 12 and extends horizontally around the sleeve from vertical groove 121 to terminate near the sleeve bore opening 35. Similarly, groove 132, formed in the outer surface of sleeve 12, extends horizontally around the sleeve from vertical groove 120 to terminate near the sleeve bore opening 34. At the terminus of each of the grooves 131, 132, ports 133, 134, through the sleeve wall respectively convey sealant through the wall to grooves around the sleeve bore openings 35 and 34. The sealant grooves around each bore opening are in two complementary parts. The sealant grooves which seal around sleeve bore opening 34 have one part formed in the outer plug surface, namely, vertical groove 137 and upper and lower lateral grooves 138 and 139, and the other part formed by vertical groove 140 in the sleeve interior. When the plug 60 is rotated to the position shown in Figures 1, 3, and 7 to close the valve, the ends of lateral grooves 138, 139, overlap the sleeve groove 140 to complete a rectangular groove means around sleeve bore opening 34, grooves 137 and 140 being to opposite sides of the bore opening and grooves 138 and 139 respectively above and below the bore opening. Groove 137 extends above groove 138 to overlap the port 134 through the sleeve wall when the plug is in the position shown in Figures 1, 3, and 7, whereby sealant is supplied to the groove rectangle through grooves 120 and 132, and port 134.

Likewise, the sealant grooves which seal around sleeve bore opening 35 have one part formed in the outer plug surface, namely, vertical groove 141 and upper and lower lateral grooves 142 and 143, and the other part formed by vertical groove 144 in the sleeve interior. When the plug 60 is rotated to the position shown in Figures 1, 3, and 7 to close the valve, the ends of lateral grooves 142, 143, overlap the sleeve groove 144 to complete a rectangular groove means around sleeve bore opening 35, grooves 141 and 144 being to opposite sides of the bore opening and grooves 142 and 143 respectively above and below the bore opening. Groove 141 extends above groove 142 to overlap the port 133 through the sleeve wall when the plug is in the position shown in Figures 1, 3 and 7, whereby sealant is supplied to the groove rectangle through grooves 121 and 131, and port 133. Referring now to Figure 8, which shows the lower part of sleeve 12 alone in vertical section, sleeve groove 140 is shown to the right around the sleeve interior from sleeve bore opening 34. The position of sleeve groove 144 at the opposite side of the sleeve is the same with respect to sleeve bore opening 35.

Referring now particularly to Figures 1 and 2, the plug 60 is shown in the closed position; that is, plug bore 73 is perpendicular to bores 30 and 32 and sleeve bore openings 34, 35, so that the plug closes the sleeve bore openings and flow through the valve flow path is stopped. To open the valve, handle end 68 is rotated to a position against the upper left hand one of the bolts 49 shown in Figure 2, thereby rotating plug 60 to align plug bore 73 with the other flow path bores and opening the flow path through the valve. An indicating arrow 146 stamped on the upper end of stem 62 indicates the position of bore 73 in plug 60 so that it can be easily determined whether the valve is opened or closed.

It is important to note that plug 60 is not secured at its lower end and is therefore "free-floating" within sleeve opening 14. The upper plug washer 72 acts only as a thrust washer, and enough clearance is allowed between reduced plug end 61 in cover opening 42 to permit the upper end of plug 60 to also be "free floating." Therefore, plug 60 may shift or float slightly toward either sleeve bore opening 34, 35, depending on which bore 30, 32, is under a higher fluid pressure. Say the valve is closed and fluid at a high pressure is in bore 30, bore 32 being downstream and at a lower pressure. The higher pressure in bore 30 will act on the upstream side of the plug to shift the plug tightly against the sleeve around sleeve bore opening 35, thereby insuring that the plug will seal sleeve bore opening 35. At the same time, a loose fit will be had between the upstream side of the plug and sleeve bore opening 34, the plug having been shifted slightly away from bore opening 34 toward bore opening 35. The extent of the plug shift in sleeve opening 14 is not great, but is great enough that the line fluid will enter between the plug and sleeve at bore opening 34, the leaked fluid around the plug within the sleeve being retained by the plug end seals formed by the sealant material in grooves 102, 109 at the two piston rings 105 at each end of the plug. The shifting of the plug causes a superior seal to be formed at downstream bore opening 35.

The reservoirs 80, 81, are filled with a sealant material in the manner heretofore mentioned. The sealant material is above the piston 92 in each of the reservoirs, and the reservoir space below each piston 92 is in open communication with one of the bores 30, 32. The lower end of each reservoir sealant space 86 is only slightly restricted by the end flange 87 therearound, which retains the piston within the reservoir, so that any drilling fluid or mud which enters the reservoir from the bore therebelow will readily drain therefrom. Therefore, there is practically no likelihood of a reservoir being plugged below the piston by fluids or cake trapped therein. Should plugging of a reservoir below the piston ever occur, the plugging is easily remedied by simply removing cover 40 and lifting the ball 91 from the reservoir, after which the piston 92 is easily accessible and can be either tapped or shoved downwardly to cause the plugging material in the reservoir to be moved into the bore below the reservoir.

The novel plug sealing system operates in the following manner. Referring to Figure 1, when a higher pressure is had in bore 32 than in bore 30, the plug being rotated to the position shown, the closed position, the pressure in bore 32 will act on the underside of the piston 92 in reservoir 81 to bias the piston upwardly in the reservoir, thereby raising the ball 91 from its seat 85 so that sealant material will flow under pressure upwardly around the ball, out through port 124 to groove 122, thence through vertical grooves 120, 121, through ports 126—129 to upper and lower grooves 109, 102, each between a pair of the piston rings 105, and also by way of groove 132 and port 134 to the rectangular groove set 137, 138, 139, 140, which surrounds sleeve bore opening 34. It should be noted that no sealant will flow to rectangular groove set 141—144 at the loosely-seated upstream side of the plug 60 because those grooves are at the same pressure as the pressure beneath piston 92 in reservoir 81, namely, the pressure prevailing in bore 32. It should be further noted that no sealant can flow out of the plug sealing system through port 123 to reservoir 80 because the ball 91 in that reservoir is seated at its seat 85 to block that flow.

Therefore, with a higher pressure in either bore 30 or 32 to either side of plug 60, the reservoir at the high pressure side will supply sealant to seal around the plug 60 at its upper and lower ends and to seal around the sleeve bore opening at the low pressure side of the plug, the pressure of the sealant in the sealing system at the same time acting on the ball 91 in the low pressure sealant reservoir to close the top of that reservoir. Thus, with the valve closed against a pressure in either direction, one reservoir acts to supply sealant to the sealing system grooves while the other reservoir is closed. If the downstream reservoir were not thus closed the sealant would have to flow into and completely fill the downstream reservoir before full pressure could build up in the seal grooves. Since in drilling fluid or cementing manifold service the pressure direction on the valves is likely to be often reversed, this feature is very important.

The plug end seals are very superior in their sealing function. It has been found that in sealing systems wherein a fluid or semi-fluid sealant is used, superior seals result when the clearances to both sides of the sealing grooves are small. The use of piston rings 105 at both sides of each plug-end sealing groove 109, 102, provides the small clearances necessary to the formation of a superior seal. The inner piston rings in grooves 100, 111, provide large pressure drops at the high pressure sides of the sealant grooves, 102, 109, respectively, thereby enabling the outer piston rings in grooves 104, 107, to seal at lower pressure drops and to retain the sealant in the grooves at a greater efficiency. Therefore, the valve in operation consumes but little of the sealant material. It should be noted that all valve pressure is confined around plug 60 between groove sets 100—104 and 107—111, so that there is little or no end thrust on the plug, all pressures acting laterally upon the curved sides of the plug.

To open the valve it is turned counterclockwise as viewed from the valve stem end. This moves the upper ends of vertical seal grooves 137 and 141 in the plug out of register with ports 134 and 133 respectively, thereby cutting off the port seal grooves from reservoir pressure. As the valve is opened the plug is no longer urged toward the downstream flow port so the clearance between the downstream grooves and the sleeve might be large enough to allow sealant to escape if under pressure, but since the grooves are cut off from reservoir pressure this does not occur. Furthermore, when the valve is opened, the pressure in the valve body may drop momentarily from upstream pressure to a lower pressure nearer downstream pressure. This would apply a pressure differential to the upstream seal grooves and possibly cause loss of sealant were not those grooves also cut off from reservoir pressure.

The seal grooves 140, 144, may be called the trailing grooves in that they are at the rear of the rest of the grooves with respect to the direction of rotation on opening the valve. If these grooves were in the plug they would sweep across the ports 34, 35 as the valve was opened and be subject to contamination and loss of sealant by the action of the line fluid, especially at the high pressure side. This is overcome to a certain degree by putting these trailing grooves in the sleeve where they remain stationary, and although in this position they are swept across by the port 73 in the plug the possibility of contamination and loss of seal is less since the groove is only in register simultaneously with the valve flow passages and the plug port for part of the time. Also, the trailing grooves are separate from the rest of the seal grooves as the valve opens so that possible loss of sealant is confined to the trailing grooves.

Another advantage of having the trailing seal groove in the sleeve is that the total area of the downstream seal groove system is not exposed to downstream pressure by passage of a groove over the flow port in the sleeve as would be the case if the trailing groove were in the plug. Any increase in the area of the plug subject to downstream pressure of course increases the differential force of the line pressure acting on the plug pushing it against the sleeve and creating friction in turning.

When the valve is in the open position, only the ports 133, 134 are open to the valve body and these are covered by the plug. Therefore there is considerable resistance to passage of sealant out of the distribution system from the reservoirs. If sealant is injected into a reservoir at this time (e. g. by connecting a sealant pump such as an "Alemite" gun to one of the check valve fittings 95) a high pressure can be built up in the reservoir sufficient to break loose any cake built up beneath the piston in the reservoir. This is an easy way to clear the reservoirs.

During sealant injection, whether for the purpose of breaking loose a cake in the reservoir or for filling same, the ball check valve at the other reservoir will close. Although this requires that both reservoirs be filled separately, it insures that pressure will not be applied to but one piston or reservoir barrier when sealant is injected for the purpose of breaking loose a mud or cement cake, thereby increasing the pressure that can be built up by reducing the number of possible paths for exit of the sealant.

The structure of the valve of this invention results in a number of advantages and improvements over valves heretofore known and used in the art. The plug 60 is not split, and is a one-piece unitary structure. It is not necessary to have a heavy high pressure bonnet and stem packing. Access to the plug and both reservoirs is easily had upon removal of cover plate 40, with no necessity for removing the valve from the line. With cover plate 40 removed, plug 60 and sleeve 12 can be removed for repairs or replacement.

Vertical alignment of the bore 73 through plug 60 is accomplished by screwing bolt 45 in or out through bottom plate 41, and securing the bolt in position with the lock nut.

The valves afforded by the invention are suitable for practically any service, but are particularly adapted to high-pressure service where the flowing fluid contains suspended gritty material such as clay, rock, sand and the like.

Valves made according to the invention are inexpensively and easily manufactured. All of the sealing grooves described are accessibly disposed so that machining costs are kept at a minimum. The split-ring piston rings 105 used in the plug end seal means are commercially available. With the plug removed from the valve body, the rings may be easily replaced by springing their split ends apart and placing them in the grooves around the plug.

Neither is the valve of this invention subject to pressure lock. The plug is always free at one side for the escape of pressure around the plug, and since the plug is not of the split type no pressure can be trapped to force both sides of the plug outwardly.

While a preferred embodiment of the invention has been shown and described herein, many modifications thereof may be made by a person skilled in the art without departing from the spirit of the invention, and it is intended to protect by Letters Patent all forms of the invention falling within the scope of the following claims:

We claim:

1. In an automatic plastic-sealed high-pressure plug valve, a one-piece cylindrical plug, a sleeve surrounding said plug, seal means between said sleeve and plug ends, and means responsive to pressures of live fluids flowing through the valve for supplying plastic sealant material to said plug end seal means to form pressure-tight seals around said plug ends, whereby said live fluid pressures within said valve are confined between the ends of said plug and there is no end thrust on said plug.

2. A plug valve comprising a body having a flow path therethrough and a cylindrical opening perpendicularly intersecting said flow path, said body also having therewithin a pair of cylindrical sealant reservoirs containing a supply of sealant therewithin each in open communication with an end of said flow path and thereby easily cleared of plugging materials introduced thereinto from said flow path, a slidable piston means in each said reservoir for transmitting flow path pressure to the sealant in the reservoir, a ball check valve of larger diameter than the reservoir diameter in a chamber provided above each said reservoir for closing the top of the reservoir and for preventing inflow of sealant to the reservoir, a sleeve disposed in said cylindrical opening of said body having opposite lateral openings aligned with said body flow path, a one-piece cylindrical plug rotatably disposed within said sleeve having a lateral bore therethrough rotatable between a position in alignment with said flow path to open said valve and a position perpendicular to said flow path to close said valve, said plug including a pair of means for sealing around both ends of said plug within said sleeve each comprising a spaced pair of split-ring piston rings each disposed in a separate groove around said plug and a sealant groove therebetween, a pair of means for sealing around said flow path at both sides of said cylindrical opening each comprising a groove in said sleeve around said flow path and a resilient sealing ring disposed in said groove, a pair of means each partly in said sleeve and partly in said plug cooperating to form seals surrounding said sleeve openings when the valve is closed whereby all pressures of fluids in said flow path are contained between said plug end seals and end thrust on said plug is minimized and each comprising sealant grooves around the sleeve opening formed in said plug and sleeve such that a groove is not moved over said sleeve opening when said plug is rotated within said sleeve to open or to close the valve and thereby reducing the opening and closing friction of the valve, a sealant passage leading from said ball chamber above each said reservoir above said ball therein each for conveying sealant from one of said reservoirs to said plug end sealing means and said sleeve opening sealing means when said one reservoir is pressured higher than the other reservoir, no sealant flowing to the said sleeve opening sealing means at the high pressure side of said plug because of the resistance of the high pressure in the flow path and aligned sleeve opening to such flow, whereby a high pressure seal is caused by said sealant at said plug ends at the low pressure downstream side of said plug when a higher pressure exists within either end of said flow path against said plug in its said closed position.

3. The combination of claim 2, said plug being loosely rotatably disposed within said sleeve and thereby free-floating therein, whereby said plug in closed position is moved by a higher fluid pressure in one end of said flow path into closer contact with said sleeve at the lower pressure flow path side thereof to form a superior seal at said lower pressure side, said plug being moved within said sleeve in either direction depending on the relative pressures at each end of said flow path.

4. An automatic plastic-sealed plug valve comprising a body having a cylindrical plug chamber therethrough and a pair of flow paths from opposite sides of said chamber to the valve exterior, a cylindrical plug rotatably disposed in said chamber having a sleeve therearound, said sleeve having extensions of said flow paths through opposite sides thereof in alignment with said flow paths, said plug having a flow path therethrough alignable by rotation of said plug with said flow paths and extensions to open said valve and rotatable with said plug to a position out of alignment with said flow paths and extensions to close said valve, a plastic sealant reservoir in said body to each side of said plug in pressure communication with one of said flow paths, sealing grooves around each end of said plug for sealing between the plug ends and the interior of said sleeve, sealing grooves around each end of said flow path through said plug for sealing therearound between said plug and said sleeve, unidirectional passage means from each said reservoir to said plug end sealing grooves and said flow path sealing grooves, whereby a higher fluid pressure in one of said flow paths, said valve being closed, will cause sealant to flow out of said reservoir in pressure communication therewith through said unidirectional passage to said plug end sealing grooves and to said flow path sealing groove at the opposite side of said plug to form seals at said grooves, no sealant being caused to flow to said flow path sealing groove at the same side of said plug because of the said higher fluid pressure at that side of the plug, and no sealant being caused to flow from said grooves to the other of said reservoirs because of said unidirectional passage therebetween, said valve being sealed in the manner described regardless of which of said flow paths said higher fluid pressure is in.

5. A plug valve comprising, a body having a vertical cylindrical opening therethrough, a pair of opposed cylindrical flow passages through said body of smaller diameter than said opening and intersecting said opening perpendicularly to its axis, a thick-walled tubular sleeve closely fixed within said opening and having continuations of said passages therethrough, a cylindrical plug rotatably disposed within said sleeve and not held against axial motion in either direction thereby, said plug having a port therethrough alignable with said passages upon rotation of said plug, a perforate means at each end of said opening for holding said plug and sleeve therewithin, reservoir means in said body for containing a supply of sealing material, a sealing groove around each end of said plug, groove means partly in said sleeve and partly in said plug forming a continuous sealing groove around the inner end of each passage, said groove being continuous through said sleeve when said plug port is not aligned with said sleeve continuations and the valve is closed and being discontinuous when said plug port is aligned with said sleeve continuations and said valve is open, ports through said body and sleeve connecting said reservoir means and sealing grooves, means responsive to line pressure for causing sealing material to flow from said reservoir means to said plug end sealing grooves and also to said continuation sealing grooves when the latter are continuous, the valve being closed, whereby the flow passages are sealed when the valve is closed and whereby all pressures within the valve are confined between the ends of the plug.

6. The combination of claim 5, the plug end sealing grooves each comprising three spaced grooves formed around the plug at one end thereof, and a split-ring piston ring disposed in each end groove of the three grooves for bearing against the interior of the sleeve and for retaining sealing material therebetween in the center groove of the three grooves.

References Cited in the file of this patent

UNITED STATES PATENTS

| | | |
|---|---|---|
| 2,332,282 | Volpin | Oct. 19, 1943 |
| 2,461,041 | Donaldson | Feb. 8, 1949 |
| 2,552,376 | Haun | May 8, 1951 |
| 2,573,238 | Wunn | Oct. 30, 1951 |

FOREIGN PATENTS

| | | |
|---|---|---|
| 731,100 | Great Britain | June 1, 1955 |

UNITED STATES PATENT OFFICE

CERTIFICATE OF CORRECTION

Patent No. 2,868,221  January 13, 1959

Robert Eichenberg et al.

It is hereby certified that error appears in the printed specification of the above numbered patent requiring correction and that the said Letters Patent should read as corrected below.

Column 9, lines 72 and 75, for "live", each occurrence, read --line--; column 10, line 50, after "plug ends" insert --and--.

Signed and sealed this 16th day of June 1959.

(SEAL)
Attest:

KARL H. AXLINE
Attesting Officer

ROBERT C. WATSON
Commissioner of Patents